UNITED STATES PATENT OFFICE.

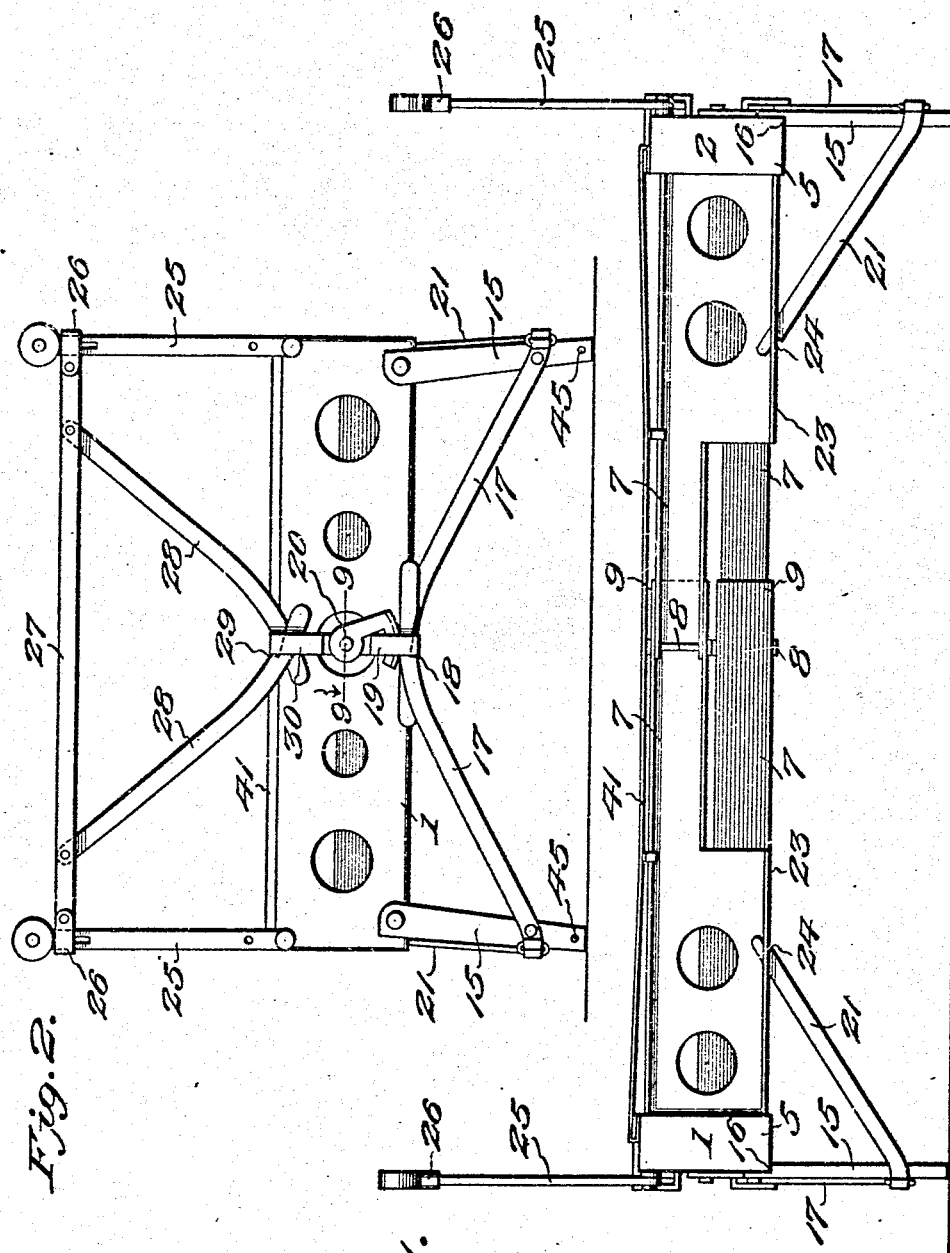

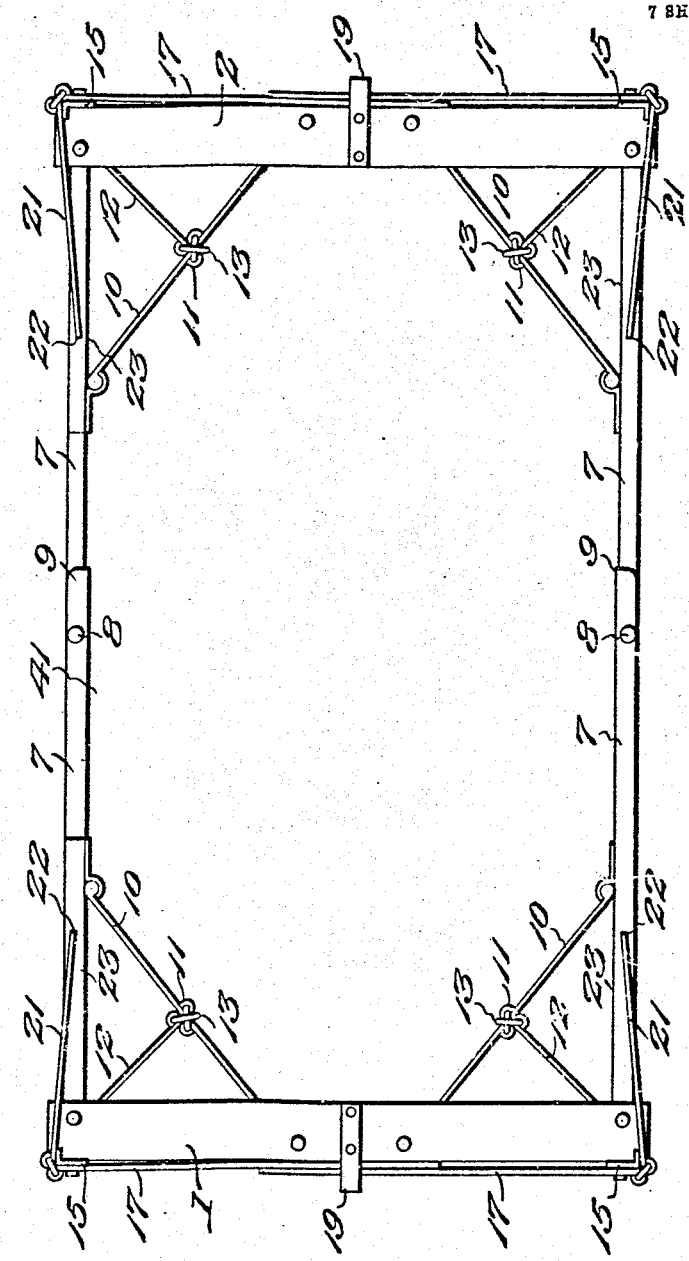

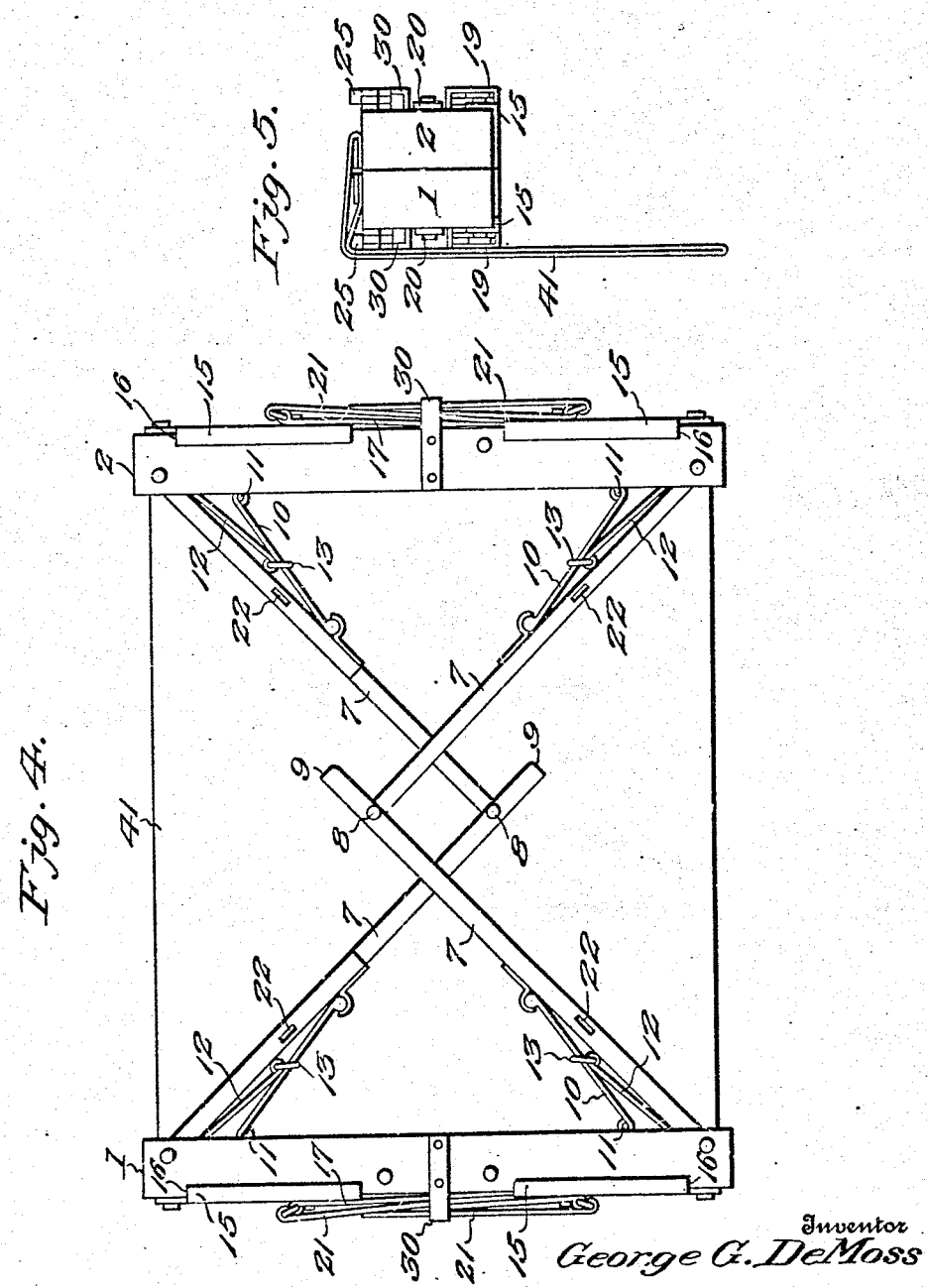

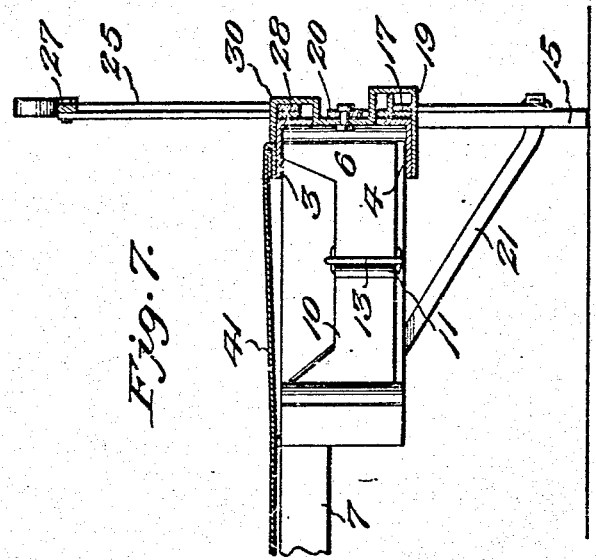
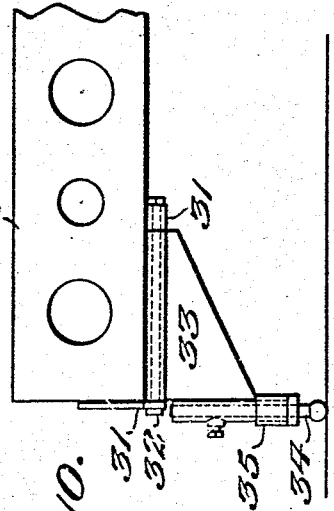
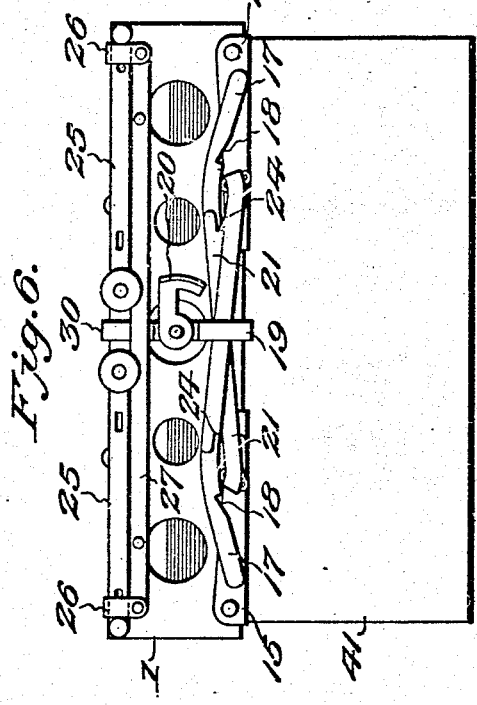
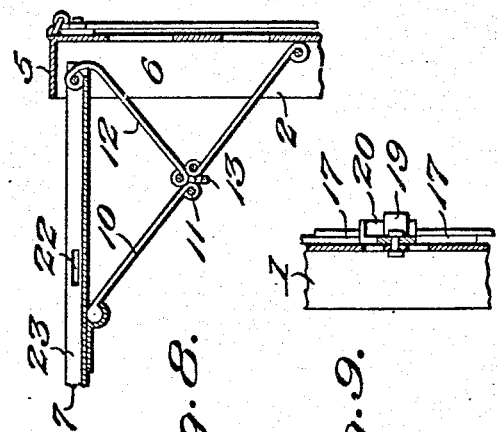

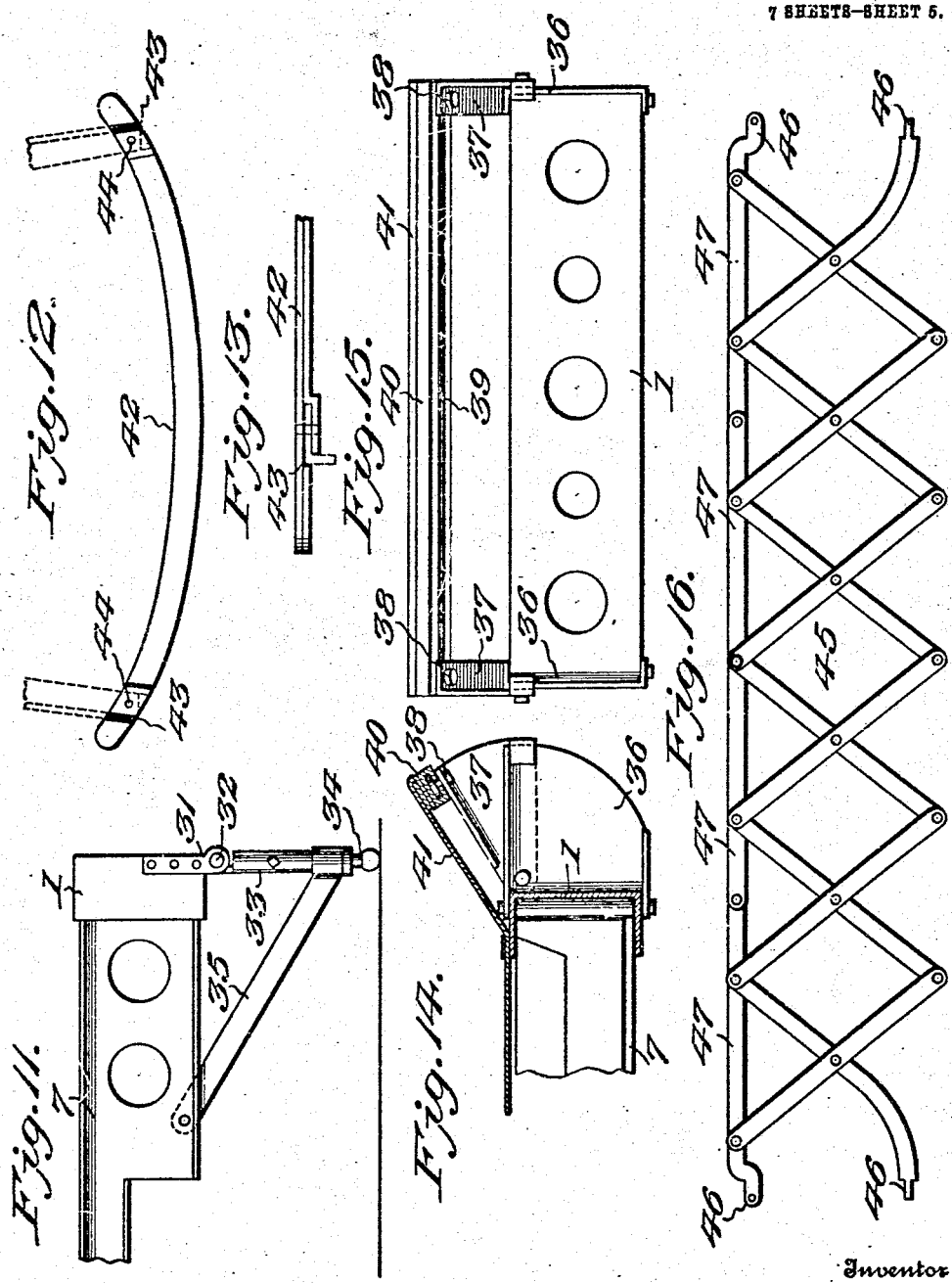

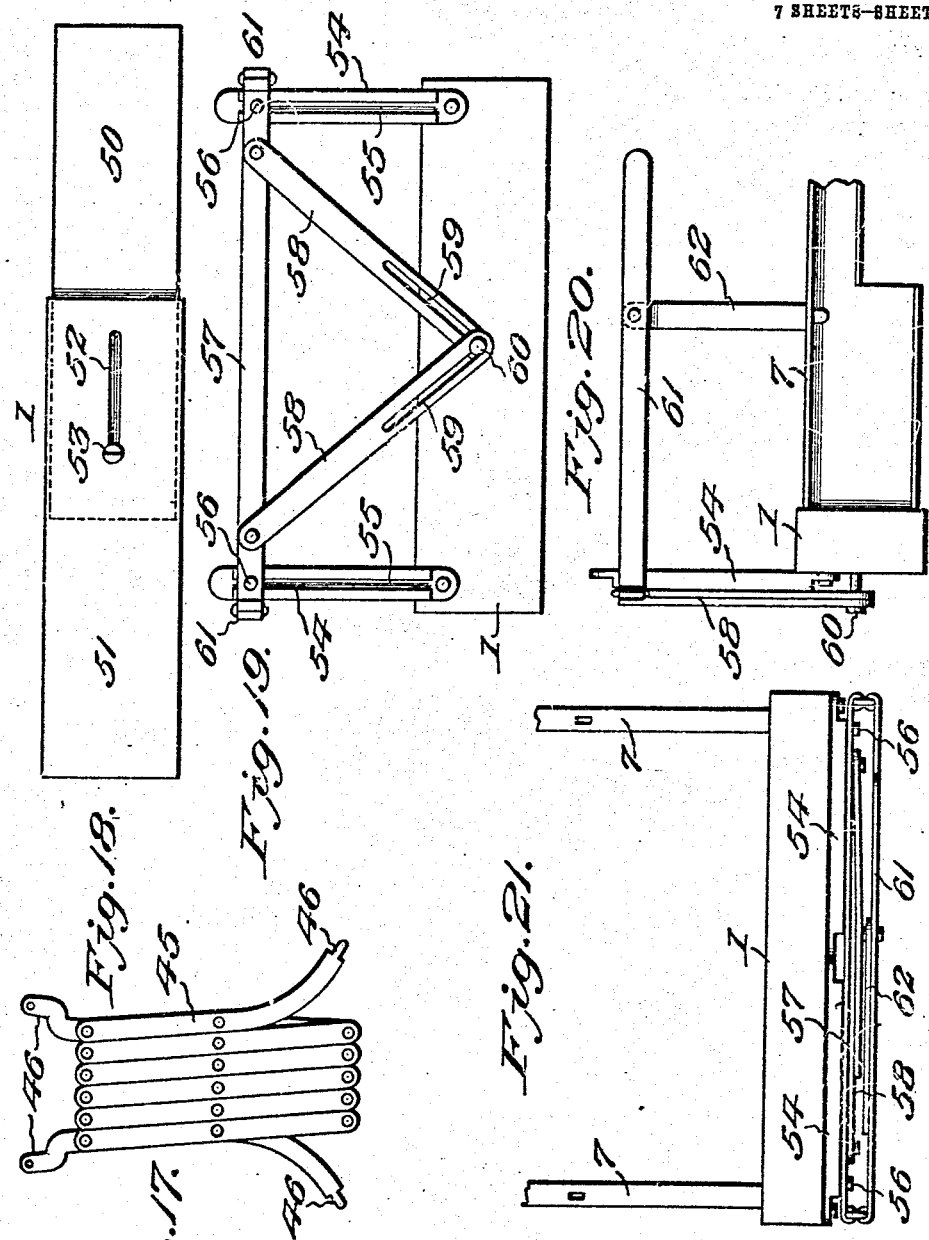

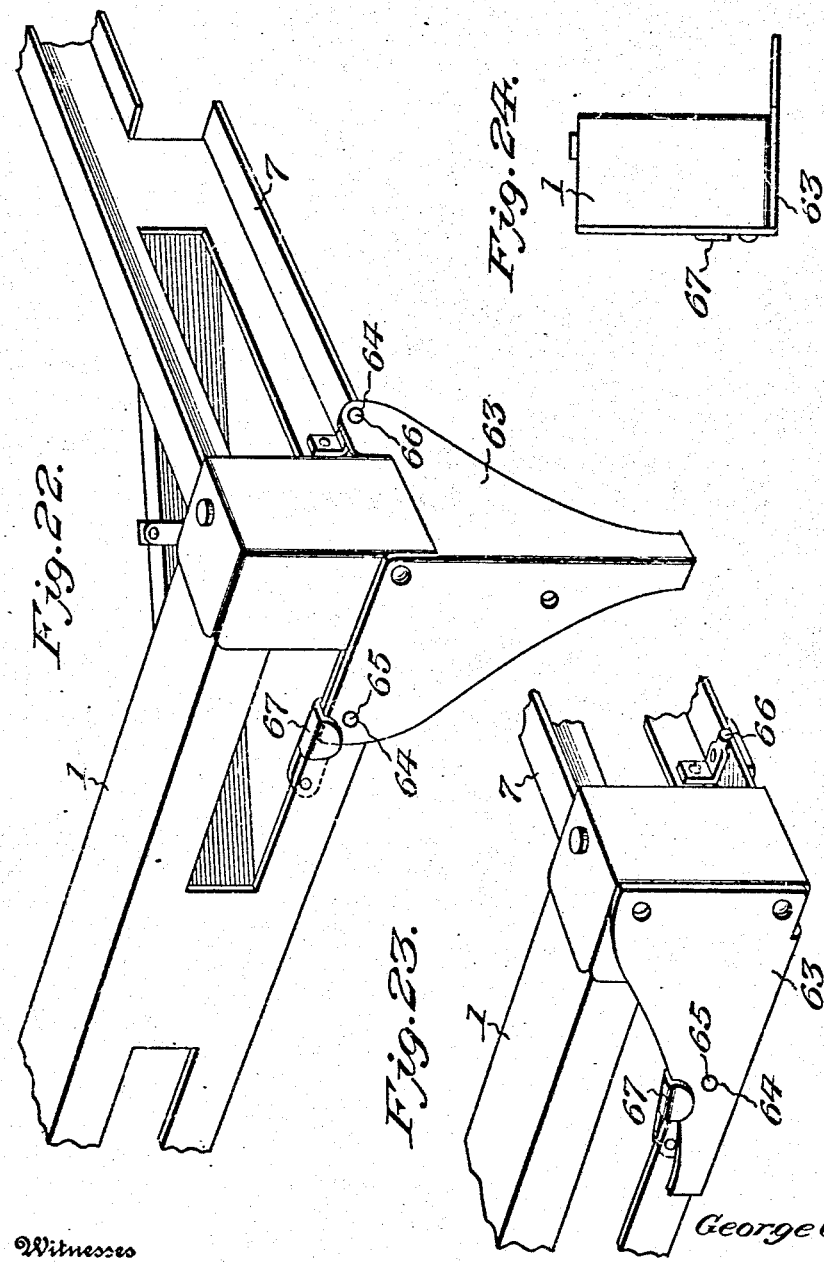

GEORGE G. DE MOSS, OF DE MOSS SPRINGS, OREGON.

BED.

991,280.     Specification of Letters Patent.     Patented May 2, 1911.

Application filed July 23, 1910. Serial No. 573,550.

*To all whom it may concern:*

Be it known that I, GEORGE G. DE MOSS, a citizen of the United States, residing at De Moss Springs, in the county of Sherman and State of Oregon, have invented new and useful Improvements in Beds, of which the following is a specification.

This invention relates to beds and more particularly to folding beds.

The object of the invention is to provide a portable bed which may be folded up into a small and compact carrying article and may be opened into operative position without difficulty.

A further object of the invention is the provision of novel supporting legs for the bed and means whereby they may be locked in open or closed position together with means for attachment to the legs whereby the bed or crib may be converted into a rocker.

A still further object of the invention is the provision of means for adjusting the width of the bed and the provision of novel head and foot pieces which are adapted to fold with the bed and be inclosed within the mattress supporting canvas.

Another object of the invention is the provision of novel means for bracing the bed when in distended position and means for preventing the braces from collapsing.

Further objects of the invention will appear as the specific description which follows is read in connection with the accompanying drawings which form a part of this application, and in which:

Figure 1 is a side elevation showing the bed in open position. Fig. 2 is an end elevation. Fig. 3 is a bottom plan view. Fig. 4 is a similar view with the parts partially collapsed. Fig. 5 is a side elevation of the bed fully closed. Fig. 6 is an end elevation of the bed fully closed. Fig. 7 is a detail longitudinal section through one end of the bed when in open position. Fig. 8 is a detail horizontal section through end of the bed in open position. Fig. 9 is a detail horizontal section on the line 9—9 of Fig. 2. Fig. 10 is a detail end elevation showing a modified supporting leg. Fig. 11 is a side elevation of the structure shown in Fig. 10. Fig. 12 is a detail top plan view of one of the rockers. Fig. 13 shows a top plan view of one end of a rocker adapted to be attached to the legs. Fig. 14 is a detail sectional view of a modified head rest. Fig. 15 is an end elevation of the structure shown in Fig. 14. Fig. 16 shows a detail elevation of a crib side in distended position adapted to be attached to the head and foot pieces shown in Fig. 1. Fig. 17 is an elevation of the same collapsed. Fig. 18 is a detail end elevation of a modified form of head piece. Fig. 19 is a detail side elevation of the same. Fig. 20 is a top plan view thereof shown in folded position. Fig. 21 is an elevation partly in section of a modified form of end member. Fig. 22 is a perspective view showing a modified form of supporting leg in open position. Fig. 23 is a perspective view showing the leg closed. Fig. 24 is an end elevation showing the sides in closed position.

Referring more particularly to the drawings, 1 and 2 represent the end pieces which are preferably constructed as shown in Fig. 7 with overhanging flanges 3 at the top and similar flanges 4 at the bottom. The ends are bent over into flanges 5 thus forming recesses 6 which are adapted to receive the side members 7 which are pivoted in the ends of the recesses to the flanges 3 and 4 and are hinged in their middle as at 8. The side members 7 are constructed of separate parts as shown and one of them overlaps the other as at 9 immediately beyond the hinge point 8 so as to form a limiting stop which prevents excessive outward movement of the sides. In order to hold these sides in distended position, there is pivoted to the sides and to the flanges 3 and 4 of the end members 1 and 2, the toggle braces 10 which are hinged in the middle as at 11 and are held in a distended position by brace bars 12 which extend diagonally across the bed, being pivoted at their outer ends upon the side pivots and having loops or bails 13 at their outer ends which surround the toggle braces 10. These braces are adapted to fold in their center with one part thereof lying alongside its connected side member and the opposite part lying alongside of the end member to which it is connected and both lying within the recess when the sides are folded. The bracing struts 12 move up when the device is folded to a position against the side member immediately beneath the adjacent toggle brace part. This arrangement is clearly shown in Fig. 4 where the parts are partially collapsed.

In order to support the bed frame above the floor, I pivot to the end members 1 and 2 the legs 15 arranged adjacent each corner thereof and constructed of substantially L-shaped material in cross section which has one side thereof cut away to form the shoulders 16 adapted to engage the flanges 4 so as to prevent excessive outward movement of the legs. The legs are braced from collapsing by means of pivoted bracing arms 17 which are carried upon the legs and are provided with notches 18 at their inner ends which engage the lower portion of the brackets 19 which are secured to the opposite ends 1 and 2 and are adapted to guide the arms 17 in their movements. The arms 17 are locked in either of their positions with the legs open or closed by a locking dog 20 which is pivoted on an extension of the bracket 19 and is adapted to swing over the top of the arms, thus holding them with the notches 18 in engagement with the bracket 19 or engaging frictionally the lower side of the arms upon the brackets. Pivoted to the legs are brace arms 21 which when the device is folded swing around parallel with the arms 17 and slide in the bracket 19. When the legs are open, these arms 21 are swung around into engagement with the slots 22 formed in the lower flanges 23 of the side members where their notches 24 engage the end wall of the slot 22 and hold the legs from movement in a direction longitudinal with the bed.

The head pieces shown are constructed of the posts 25 which are pivoted to the end members 1 and 2 so that in their collapsed position they may lie alongside of the end members. Slidably connected with the post 25 by means of stirrups 26 which surround and slide upon the post, are the head bars 27 which are supported by diagonal struts 28 having notches 29 to engage an extension 30 of the bracket 19. These struts 28 are pivoted to the head bar 27 and are adapted to slide in the extension 30. When folded the struts lie adjacent the end members and the stirrups pivot upon the bar 27 to permit the posts 25 to be folded downwardly upon the top of said bar in the position shown in Fig. 5.

In the modification shown in Fig. 10 there is secured to either side of the end members a pair of supporting ears 31 in which is journaled a pin 32 carrying the bracing web 33 which has adjustably mounted in its vertical side the supporting leg 34. Pivoted to the connecting web and lying in a plane parallel with its under edge, is a bracing arm 35 which, when the leg is thrown to open position, as shown in Fig. 10, engages the side member and locks the leg from movement in either direction longitudinally of the bed, while the web 33 supports and braces the leg laterally of the bed. In the position shown in Fig. 11 the web is bent up alongside the bed together with the arm which lies parallel with its under edge.

The supporting or elevating head shown in Fig. 14 comprises a pair of leaves 36 which are arranged for lateral movement upon the end members 1 and 2 of the bed and have pivoted thereto for vertical movement, the leaves 37 which are provided on their upper outer ends with headed studs 38 adapted to slide in a slot 39 formed in the under side of the head piece 40. The canvas 41 of the bed is stretched over and secured to the head piece and when this head supporting device is folded, the leaves 37 are folded upon the leaves 36 and the latter leaves are folded inwardly over the end members 1 and 2, the studs 38 sliding in the slots 39. If the type of leg shown in Fig. 10 is used, the web will be folded over the leaves.

When it is desired to convert the bed into an infant's crib, the rocker 42 shown in Figs. 12 and 13 is employed. This rocker is preferably constructed of a piece of metal bent back upon itself and open adjacent its ends as shown in Fig. 13 to receive the end of the legs. A suitable slot 43 is formed at each end immediately adjacent the open portion so as to receive the lateral flange on the leg and extending through the rocker transversely are openings 44 which correspond with similar openings 45 in the end of the legs and are adapted to receive locking pins By placing a rocker of this character on either end of the bed, it may be converted into a crib for children. When the bed is converted in a crib by the attachment of rockers, the lazy tong sides 45 are used with their ends reduced as at 46 to enter apertures in the posts 25. In order to hold the sides in distended position, I connect to the upper end of their cross arms where they are pivoted, the bracing arms 47 which are provided in their center with knuckle joints which act when the arms are thrown to their upper position, to lock the sides from collapse. In place of the rockers for the child's crib, the legs may be supplied with casters of any suitable type.

In practice, several mattress supporting canvases may be furnished with the bed so that the width thereof may be adjusted by extending the end members 1 and 2 which, as shown in Fig. 18, is composed of two parts 50 and 51, the latter being slotted as at 52 to receive the set screw 53 which is connected to the member 50 and passes through the slot 52.

In the modification shown in Figs. 18 and 19, the posts 54 are pivoted to the end members 1 and 2 and are provided with slots 55 in which the studs 56 carried by the head bar 57 are adapted to slide. Pivoted to the head bar are bracing arms 58 which extend diagonally toward one another across the end of the bed and are provided with slots 59 to engage a pin 60. The end of the slots are offset so that by pressing the arms apart, the pin will be engaged with the offset portion. The head members 57 have connected to them the side pieces 61 which interlock as shown in Fig. 19, and have pivoted to them the depending legs 62 which rest upon the top of the sides 7 and support the side bar when in distended position. The legs 62 fold up on the side bars 61 and the side bars fold over adjacent the arms 58 on the end members as shown in Fig. 20, while the posts fold down between the head bars and the end members 1 and 2.

In the modification shown in Figs. 22 to 24 inclusive, the end member has pivoted thereto the supporting legs 63 which are substantially V-shape in cross section and have their sides tapering off toward their lower ends. Each side is provided with a suitable aperture 64 adapted to be engaged by pins 65 and 66 when the legs are in open position. The sides are so constructed as to spring into engagement with the pins and the leg is locked in open or closed position by a clip 67 which is pivoted upon the end member and adapted to lap over the side of the leg as shown. The opposite side of the leg is adapted to swing into engagement with its pin 66 and prevent lateral movement.

Having thus described the invention, what is claimed is—

1. A bed frame comprising end members having recesses therein, two-part side members hinged together and to the end members, means for limiting the outward movement of the side members, toggle braces connecting the side members into the recesses, and a bracing arm hinged to the end members and adapted to hold the toggle braces in bracing position together with folding head pieces and folding supporting legs.

2. A bed frame comprising recessed end members, two-part side members hinged together, means to limit the outward movement of the side members, means pivoting said side members to the end members whereby they will fold within the recesses, folding braces connecting the end members and the side members and adapted to lie within the recesses, bracing arms carried by the end members and adapted to prevent collapse of the toggle braces, and means carried by the folding arms for preventing excessive outward movement of the braces.

3. In a bed, recessed end member, side members connected to the end members and adapted to fold within said recesses, means for bracing the side members to the end members, said bracing means being hinged to the side and end members so as to fold with the side members within the recesses, bracing arms connected to the end members, and loops carried by the bracing arms adapted to hold the bracing means in operative position.

4. In combination with a folding bed frame, folding legs connected thereto, bracing means for said legs adapted to prevent movement of the legs laterally of the bed, and auxiliary bracing means pivoted to the legs and adapted to engage the frame to prevent movement of the legs longitudinally of the bed, together with folding head pieces carried by the frame, and means to prevent collapse of said head pieces.

5. In combination with a folding bed frame, comprising end pieces and hinged side members, of a mattress supporting fabric secured to the end members, means to detachably connect the fabric to the side members, and means whereby the fabric may be used to cover the bed frame when the same is folded without disconnecting the fabric.

In testimony whereof I affix my signature in presence of two witnesses.

GEORGE G. DE MOSS.

Witnesses:
W. C. BRYANT,
ONEITA WEBB.